United States Patent Office 3,162,536
Patented Dec. 22, 1964

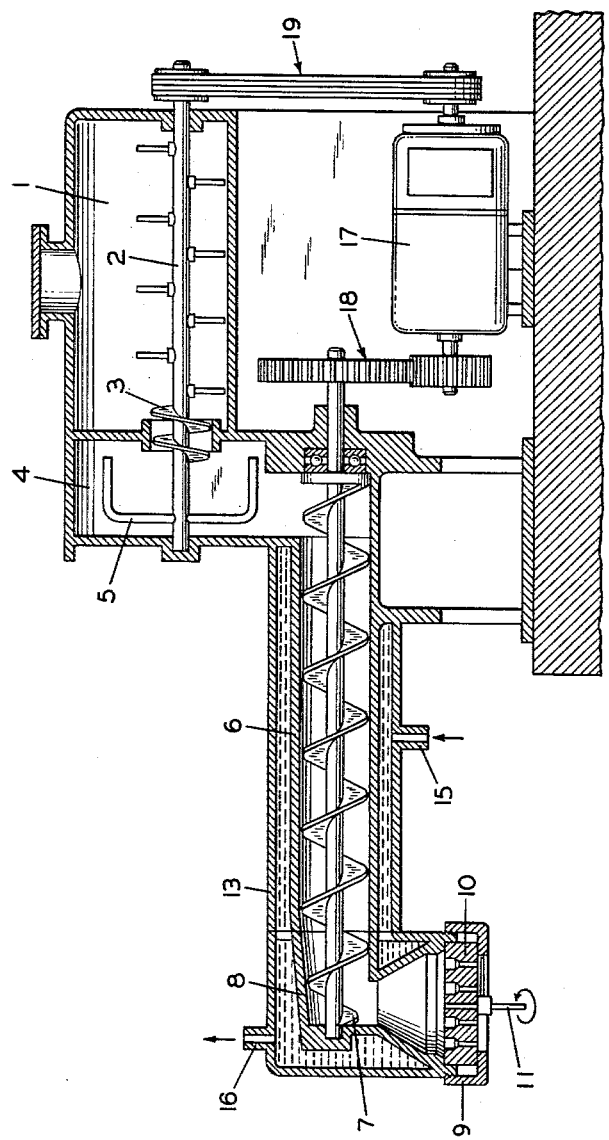

3,162,536
METHOD FOR PRODUCING ALIMENTARY PASTE FOODS FROM STARCHY FLOURS OF LOW PROTEIN CONTENT
Ernst Kaufmann, Sankt Gallen, Switzerland, assignor to Gebrueder Buehler, Uzwil, Switzerland, a Swiss firm
Filed Oct. 18, 1960, Ser. No. 63,297
Claims priority, application Switzerland Oct. 19, 1959
6 Claims. (Cl. 99—85)

This invention relates to a method and apparatus for producing alimentary paste foods and, more particularly, to a method and apparatus for producing such foods from starchy flours of low protein content.

While starchy flours produced from manioc tubers, peanuts, chestnuts, potatoes, and the like, possess a high food value, because of their low protein content they cannot be used like wheat flour and the like for making conventional alimentary paste food products such as spaghetti. Attempts have been made heretofore to produce sterling food products from such flours. One method, for example, consists in forming a flour and moistening such flour with lukewarm or cold water and then pressing the moistened flour. As the moistened flour leaves the press, the mass is subdivided into small pieces which are of tough or hard consistency. Such product, however, can only be fried in hot oil or fat and cannot be boiled in water like spaghetti or the like.

It is an object of the present invention to provide a wholesome paste food of high food value from flours of manioc tubers, peanuts, chestnuts, potatoes and the like.

It is a further object to provide such a product which may be boiled in water like spaghetti.

According to the present invention, a paste foods product is formed from starchy, low protein flours by intimately mixing such flour with hot water, vacuum treating the dough formed in the mixing step and pressing and heating the vacuum treated dough and extruding it from a press.

Apparatus for carrying out the invention includes a mixing chamber, a vacuum chamber conveyor means between the mixing chamber and vacuum chamber, a heated pressure chamber, a pressure screw in the pressure chamber, and an extrusion head at the exit end of the pressure chamber.

One form of an alimentary paste press suited for carrying out the method according to the instant invention is diagrammatically shown in the accompanying drawing.

The press comprises a mixing chamber 1 having therein a mixer shaft 2 and a feed screw 3 for moving dough from mixing chamber 1 into a vacuum trough 4 from which it is transferred by a feed reel 5 into a pressure cylinder 6. Pressure cylinder 6 is provided with a pressure screw or worm 7. Extrusion head 8 is connected to the forward or exit end of pressure cylinder 6 and a die 10 is secured to extrusion head 8 by a cap nut 9. A knife 12, driven from a shaft 11, rotates on the delivery or exit side of die 10. Pressure cylinder 6 and extrusion head 8 are surrounded by a heating jacket 13 which is heated by hot water or steam which enters at 15 and is discharged at 16. Motor 17 is connected by gears 18 to worm 7 and by belts 19 to mixer shaft 2, feed screw 3 and feed reel 5.

In operation, the starchy flours of low protein content are put into mixing chamber 1. The starchy flour may be a flour from one of the low protein food products, such as manioc tubers, peanuts, chestnuts, or potatoes, or may be a mixture or blend of such flours. For example, the following composition of blended flours has been discovered to be a particularly useful mixture:

60 parts by weight of manioc flour;
15 parts of peanut flour degreased to a maximum fat content of 8%; and
25 parts of wheat flour.

Hot water is added to this composition in such amount that the water content of the resulting dough is from 30 to 40% by weight of the wet substance. The temperature of the water added is from approximately 80° C. to 100° C. to produce a dough temperature of approximately 40° to 45° C. in the mixing chamber.

Maintaining the temperature of the dough at between approximately 40° C. to 45° C., the flour composition and water are intimately mixed for approximately twenty minutes and then moved by feed screw 3 into vacuum trough 4 where the mixed dough is subjected to a vacuum treatment to remove free air.

The evacuated dough is moved by feed reel 5 from vacuum trough 4 into pressure cylinder 6 wherein pressure screw 7 forces the dough into extrusion head 8. As the dough moves through pressure cylinder 6, the temperature of the dough is increased to approximately 80° C. by the passage of hot water or steam through heating jacket 13. From extrusion head 8, the dough is forced outwardly through die 10 where it is cut by knife 12.

The heating of the dough in the pressure cylinder 6 to a large extent hydrates the starch present in the low protein flours. Thus, the strands of dough pressed out through die 10 are gelatinized not only on their surface but throughout their body. On discharge from die 10, the dough strands are cut into desired lengths, for example, the strands may be cut into lengths similar to grains of rice. The cut strands or grains are then dried in any known manner to an ultimate moisture content of 10 to 12% by weight.

Products produced in this manner when tested in the uncooked state by the so-called chewing test, have an elastically yieldable character which may be attributed to the gelatinization of the starch throughout the cut strands or grains.

It is, of course, possible to deviate from the proportions recited in the above example. Depending on the particular properties of the starchy flours of low protein employed, the composition of the flour and the water content of the dough and the processing temperature applied thereto may be adapted to the various needs.

The flour may be in a pure form or intermixed by adding wheat flour, grits or middlings, or rice flour, depending on the properties desired in the finished product.

The terms and expressions which have been employed are used as terms of description and not of limitation, and there is no intention, in the use of such terms and expressions, of excluding any equivalents of the features shown and described or portions thereof, but it is recognized that various modifications are possible within the scope of the invention claimed.

What is claimed is:

1. A method for producing paste foods from starchy, low protein flour selected from the group consisting of manioc tubers, peanuts, chestnuts, potatoes and mixtures and blends thereof comprising, the steps of intimately mixing such flour with water at a temperature of from approximately 80° to 100° C. for approximately twenty minutes to form a dough, vacuum treating said dough to remove free water therefrom, pressing the vacuum treated dough and, while pressing the vacuum treated dough, increasing the temperature of said dough to approximately 80° C., extruding said pressed and heated dough, cutting said extruded dough into lengths and, thereafter, drying said extruded and cut dough to reduce the moisture content thereof to an ultimate moisture content of 10% to 12% by weight of the dried dough.

2. In a method of producing paste food products as recited in claim 1 wherein a high protein component selected from the group consisting of grits and middlings and the flours of wheat and rice is added to the starchy, low protein flour before said water is added thereto.

3. A method for producing paste food from starchy, low protein flour selected from the group consisting of manioc tubers, peanuts, chestnuts, potatoes and mixtures and blends thereof, comprising the steps of intimately mixing such flour with water heated to a temperature not substantially less than 80° C. and not substantially greater than 100° C. to form a dough of said flour and said water at a dough temperature not substantially lower than 40° C. and not substantially higher than 45° C., while maintaining said dough at a temperature not substantially lower than 40° C. and not substantially higher than 45° C., vacuum treating said dough to remove free air therefrom and, thereafter, pressing and heating the vacuum treated dough to a temperature not substantially higher than 80° C. and extruding said pressed and heated dough.

4. In the method recited in claim 3 wherein a high protein flour is added to said starchy, low protein flour before hot water is added to said flour.

5. In a method as recited in claim 3 wherein the water content of the mixed dough is from approximately 30% to 40% by weight of the wet substance.

6. In a method as recited in claim 4 wherein the water content of the mixed dough is from approximately 30% to 40% by weight of the wet substance.

References Cited in the file of this patent

UNITED STATES PATENTS

| | | |
|---|---|---|
| 2,704,723 | Poole | Mar. 22, 1955 |
| 2,708,636 | Rivoche | May 17, 1955 |
| 2,868,144 | Ambretti | Jan. 13, 1959 |
| 2,914,005 | Donde Gorozpe | Nov. 24, 1959 |

FOREIGN PATENTS

| | | |
|---|---|---|
| 568,093 | Great Britain | Mar. 19, 1945 |